(12) United States Patent
Mathison et al.

(10) Patent No.: US 10,021,557 B1
(45) Date of Patent: Jul. 10, 2018

(54) UNIVERSAL GUTI FOR SIMPLIFIED DEVICE ONBOARDING

(71) Applicant: Verizon Patent and Licensing Inc., Arlington, VA (US)

(72) Inventors: James Mathison, Warren, NJ (US); Zhengfang Chen, Millburn, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/820,026

(22) Filed: Nov. 21, 2017

Related U.S. Application Data

(63) Continuation-in-part of application No. 15/680,889, filed on Aug. 18, 2017.

(51) Int. Cl.
*H04W 4/00* (2018.01)
*H04W 8/06* (2009.01)
*H04W 8/08* (2009.01)
*H04L 29/12* (2006.01)

(52) U.S. Cl.
CPC ............... *H04W 8/06* (2013.01); *H04L 61/20* (2013.01); *H04W 8/08* (2013.01); *H04L 61/6054* (2013.01)

(58) Field of Classification Search
CPC .......... H04W 8/06; H04W 8/08; H04L 61/20; H04L 61/6054

USPC ...................................................... 455/435.1
See application file for complete search history.

(56) References Cited

U.S. PATENT DOCUMENTS

| | | | |
|---|---|---|---|
| 9,860,906 | B2 | 1/2018 | Shaw et al. |
| 9,883,440 | B2 | 1/2018 | Zembutsu et al. |
| 2011/0256896 | A1 | 10/2011 | Giaretta et al. |
| 2011/0268047 | A1 | 11/2011 | Nath et al. |
| 2012/0203894 | A1 | 8/2012 | Lee et al. |
| 2013/0016657 | A1 | 1/2013 | Muhanna et al. |
| 2013/0070775 | A1 | 3/2013 | Qu |
| 2013/0339438 | A1 | 12/2013 | Cherian et al. |
| 2014/0206314 | A1 | 7/2014 | Abdallas |
| 2014/0269779 | A1 | 9/2014 | Shan et al. |
| 2016/0007138 | A1 | 1/2016 | Palanisamy et al. |
| 2017/0251103 | A1 | 8/2017 | Zembutsu et al. |

*Primary Examiner* — Charles Shedrick

(57) ABSTRACT

A method includes determining, by a user equipment (UE) device, whether subscriber identification profile (SIDP) is stored within the UE device; sending, from the UE device, an attach request along with a universal globally unique temporary identifier (UGUTI) to a mobility management entity (MME) within a network, upon determining that the subscriber identification profile is not stored in the UE device; receiving, at the UE device, an authorization to attach to the network in response to the attach request; and accessing, by the UE device, the network in accordance with a pre-provisioned profile associated with the UGUTI, where the pre-provisioned profile limits access to the network.

20 Claims, 8 Drawing Sheets

US 10,021,557 B1

UNIVERSAL GUTI FOR SIMPLIFIED DEVICE ONBOARDING

CROSS REFERENCE TO RELATED APPLICATIONS

This application is a continuation-in-part (CIP) of application Ser. No. 15/680,889, entitled "DEDICATED APN ACCESS USING DEFAULT NETWORK ACCESS KEY FOR PROFILE DOWNLOAD, filed on Aug. 18, 2017, the content of which is hereby incorporated herein by reference in its entirety.

BACKGROUND

New applications of wireless communication technologies are driving emerging classes of user equipment (UE) devices that may include non-traditional form factors. The so-called "internet of things" (IoT) may include such devices that can be installed and operated at specific locations without the benefit of a traditional user interface (e.g., display, keyboards, buttons, etc.). The IoT can include a class of UE devices called machine-to-machine (M2M) devices that may that exchange data during normal operation without substantial or ongoing interactions with human users. While such M2M devices may typically be small in size and simple in hardware and/or software design, very large numbers of M2M devices will have to be onboarded for communications with wireless networks.

DETAILED DESCRIPTION OF THE PREFERRED EMBODIMENTS

Figure 1:
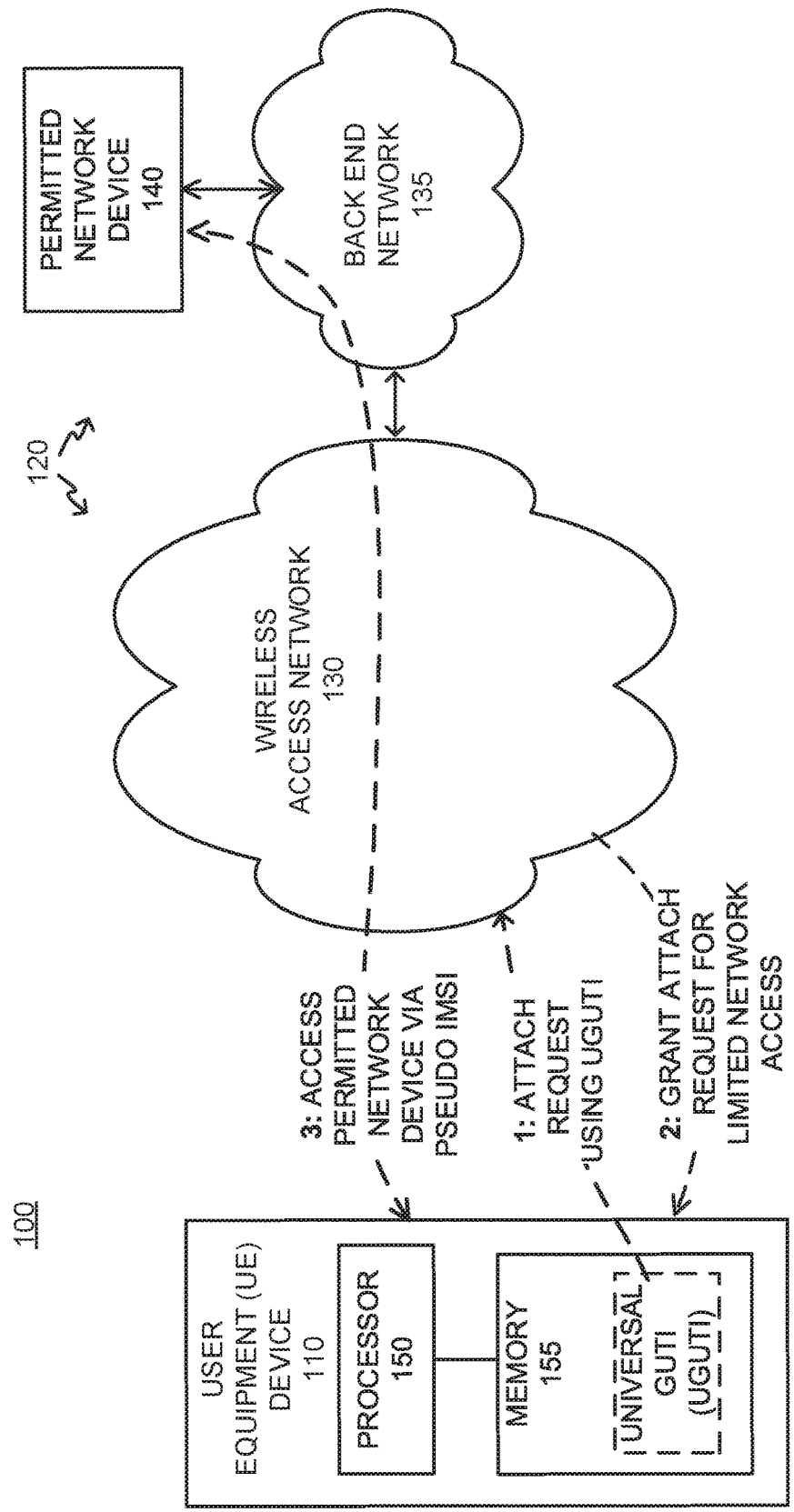
FIG. 1 is a block diagram of an exemplary environment for using a universal globally unique temporary identifier (UGUTI) to access a network without a subscription to the network.

The following detailed description refers to the accompanying drawings. The same reference numbers in different drawings may identify the same or similar elements. The following detailed description does not limit the invention.

Embodiments are directed to user equipment (UE) devices that may use a universal globally unique temporary identifier (UGUTI) for onboarding a UE device to a network. The UGUTI is uniquely associated with a UE device and may act as a credential submitted by the UE device to the network. The UGUTI may be considered valid by the network for any UE device that presents the UGUTI. The onboarding process may occur without the user having a subscription with the network operator, and may provide restricted access to the network for one or more predefined purposes.

For example, the onboarding process may be used to provide restricted access to a specified server to allow a user to automatically establish a service plan to the network. This process may be accomplished, autonomously, without the assistance of technical support. In yet another embodiment, onboarding may provide restricted access to services that sponsor data access, so that the user's account is not credited with the data consumption associated with a particular event or data source.

Accordingly, embodiments described herein leverage technology within the UE devices to enable a simple and convenient way for a user to initiate access (i.e., onboard) to the network with the UE device without a subscription plan, wherein the initial access is limited (i.e., "restricted access") within the network. Access may be restricted by limiting the UE device to a dedicated access point name (APN). The dedicated APN may be considered as a bearer that provides restricted access to a permitted network device for exchanging data. As will be detailed below, embodiments also provide a mechanism for onboarding without using the actual international mobile subscriber identifier (IMSI) of the UE device which is compatible with existing 3GPP standards. In such embodiments, the UE device IMSI may be replaced by a network assigned pseudo-IMSI.

Embodiments herein obviate or eliminate the user from activating the UE device at the point of sale. Thus, if a user wishes to activate a service plan at a later date, the user does not have to return the UE device to the point of sale, or interact with customer support which may be time consuming and frustrating. Additionally, users will not have to concern themselves with an integrated circuit card identifier (ICCID) and/or IMEI values (which may not be printed on the device, or included in packaging materials that may be unavailable). Moreover, most M2M devices may have a minimal or no user interface for entering long ICCID and/or IMEI values, thus making the initialization of the device by a user difficult even upon receiving remote support via a telephone or the internet. As noted above, various embodiments described herein eliminate the aforementioned issues, and thus provide an easy "onboarding" experience for the user and the UE device.

FIG. 1 is a block diagram of an exemplary environment for using a universal globally unique temporary identifier (UGUTI) to access a network without a subscription. Access using the UGUTI may involve an onboarding process as described above. However, in other embodiments, access using the UGUTI may not be restricted to simply onboarding. For example, the UGUTI may be used with network access associated with a particular application. Environment 100 may include a user equipment (UE) device 110, network 120, and permitted network device 140. UE device 110 may further include a processor 150 and a memory 155. Memory 155 may store the UGUTI which may be used for the onboarding process as described in detail below. Network 120 may include wireless access network 130 and back end network 135. For ease of explanation, only one UE device 110 and permitted network device 140 are illustrated as being connected to network 120. However, it should be understood that a large number of UE devices 110, permitted network devices 140, or other known network entities, may be communicatively coupled to network 120.

UE device 110 may communicate wirelessly with wireless access network 130 using any type of wireless channel, including cellular standards such as long term evolution (LTE), and other local, mesh, and/or wide area wireless networking standards (e.g., any type of WiFi networking). Wireless access network 130 may communicate with back end network 135 over backhaul network wired connections (e.g., fiber optic connections) and/or wireless connections (e.g., microwave links). Back end network 135 may communicate with other network devices, such as permitted network device 140, over private and/or public networks, including the Internet, using any appropriate wireless and/or wired connections.

Network 120 may include a plurality of networks of any type, and may be broadly grouped into a wireless access network 130 and a back end network 135. Wireless access network 130 provides connectivity between UE device 110 and other network elements within wireless access network 130 and/or devices connected to back end network 135. Wireless access network 130 may include any type of wireless network, such as, for example, one or more telecommunications networks including wireless public land mobile networks (PLMNs). The PLMN(s) may include a Global System for Mobile Communications (GSM) PLMN, a Long Term Evolution (LTE) PLMN, and Advanced LTE PLMN, and/or other types of cellular networks and/or PLMNs not specifically described herein. Wireless access network 130 may further include one or more local and/or wide area wireless network. A local area wireless network may include any type of WiFi (e.g., any IEEE 802.11x network, where x=a, b, c, g, and/or n). A wide area wireless network may include any type wireless network covering larger areas, and may include a mesh network (e.g., IEEE 802.11s) and/or or a WiMAX IEEE 802.16.

Back end network 135 may exchange data with wireless access network 130 to provide UE device 110 connectivity to various servers, gateways, and other network entities, which may include one or more permitted network devices 140. Back end network 135 may include a wide area network (WAN), a metropolitan area network (MAN), an intranet, the Internet, a wireless satellite network, a cable network (e.g., an optical cable network).

UE device 110 may include any type of electronic device having communication capabilities, and thus communicate over network 120 using a variety of different channels, including both wired and/or wireless connections. UE device 110 may include, for example, any type of M2M device which may be part of the IoT, which may include, for example, sensors, cameras, appliances, measurement devices, security devices, traffic control devices, vehicle navigation devices, parking meters, connected appliances, medical devices, etc. UE device 110 may further include a cellular radiotelephone, a smart phone, a tablet, a wireless hotspot (e.g., a Jetpack device), a set-top box (STB), a mobile phone, a Voice over Internet Protocol (VoIP) device, a laptop computer, a palmtop computer, a gaming device, or a media player device that includes communication capabilities (e.g., wireless communication mechanisms). UE device 110 may include processor 150 that may primarily function at the operating system and application level, and exchange user data within the access stratum. UE device 110 may further include a modem (not shown) that performs signal processing and communications operations for communicating over a wireless channel. UE device 110 may also include memory 155 that may be associated with a secure element, an embedded universal integrated circuit card (eUICC), or any compatible chipset. Memory 155 may include secure storage (e.g., a protected, non-volatile solid state memory) for storing a UGUTI. Depending upon the onboarding process and/or state of UE device 110, memory 155 may also receive and store a subscriber identification profile (SIDP) (not shown in FIG. 1). The UGUTI may be preloaded into memory 155 at manufacture, and is unique from UE device to UE device.

Permitted network device 140 may be an authorized device that can be accessed using a particular APN that may be uniquely associated with the UGUTI by wireless access network 130. Permitted network device 140 may be a standalone device, (such as, for example, a server), or may be embodied as a software module residing in another element or device in wireless access network 130. Permitted network device 140 may provide any type of data and/or service, such as, for example, establishing subscriptions for service plans for wireless access network 130, providing access associated with particular applications installed on UE device 110, and/or for providing subsidized data for a predefined network access class which does not count against a user's data plan.

Further referring to FIG. 1, the following is an example of UE device 110 using the UGUTI to communicate via a dedicated APN to access permitted network device 140. Initially UE device 110 may, during a power up in response to detecting a specific condition or in response to a predetermined command provided by a user, scan to find a targeted operators' network. The detected specific condition may include, for example, the lack of a SIDP stored in memory 155 or an error signal from wireless access network 130. Upon detecting the network, UE device 110 may send an attach request to wireless access network 130 (see: 1. ATTACH REQUEST USING UGUTI). The attach request may include UGUTI instead of using UE device's 110 international mobile subscriber identity (IMSI) as is typically used in a conventional attach request to wireless access network 130. Wireless access network 130 may associate the received UGUTI with a pseudo IMSI for UE device 110 for operation with wireless access network 130. The pseudo IMSI permits unique identification of UE device 110 with various elements in wireless access network 130.

In an embodiment, the internet protocol (IP) address of permitted network device 140 may be "white listed" on the dedicated APN in order to provide UE device 110 with restricted access. In response, wireless access network 130 may grant the initial attach request (see 2. GRANT ATTACH REQUEST FOR LIMITED NETWORK ACCESS). Wireless access network 130, based on the UGUTI and profiles associated therewith, will then allow UE device 110 restricted access to permitted network device 140 (see 3. ACCESS PERMITTED NETWORK DEVICE VIA PSEUDO IMSI). This restricted access prohibits UE device 110 from accessing other devices via the dedicated APN and thus provides a "walled garden" for UE device 110. The restricted access prohibits UE device 110 from any other type of APN access, such as, for example access to chat services, VoIP services, internet multimedia services (IMS), Internet services, administrative services, etc.

Figure 2:
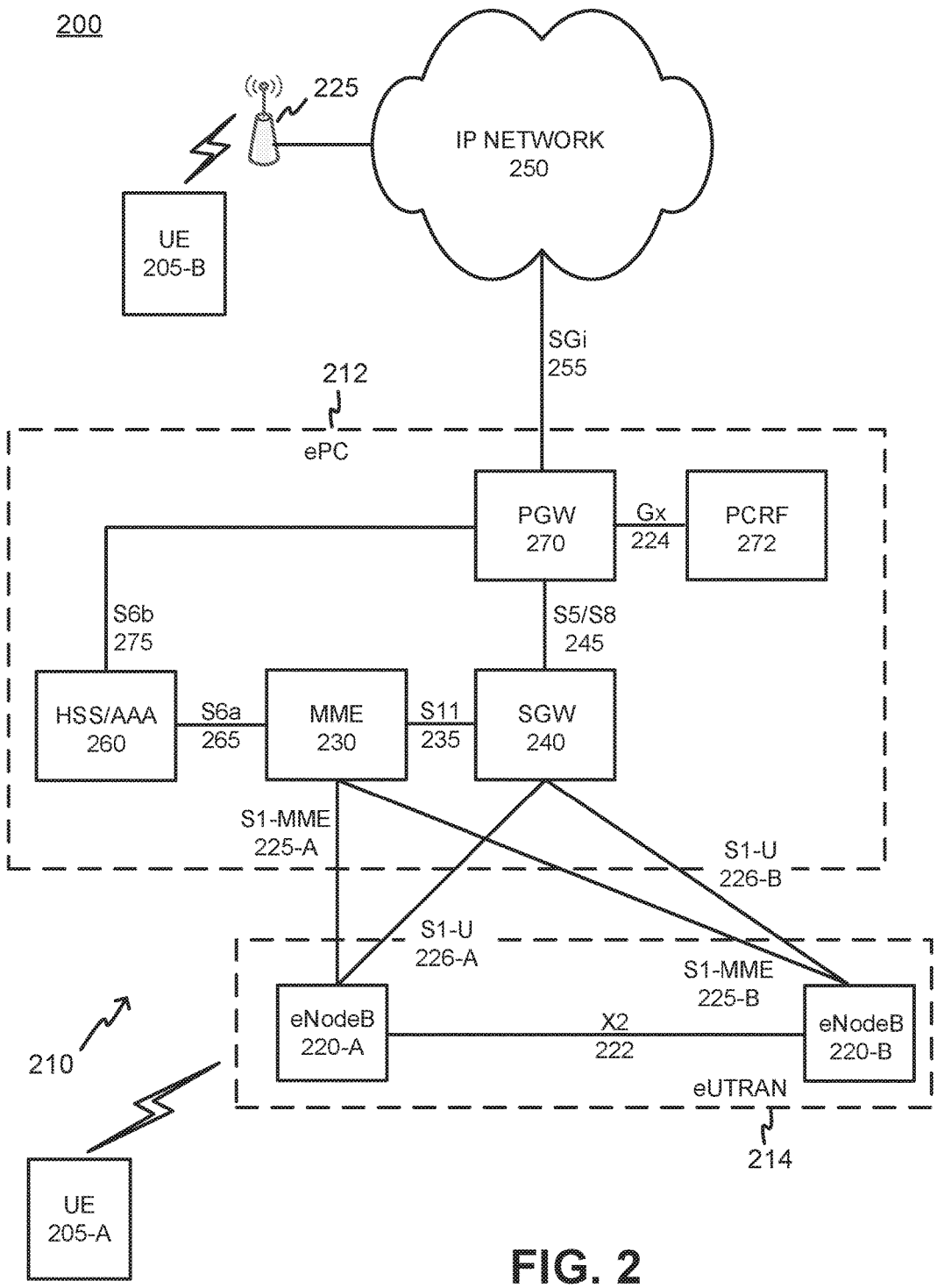
FIG. 2 is a block diagram of an exemplary networking system having a long term evolution (LTE) wireless access network.

FIG. 2 is a block diagram of an exemplary networking system 200 having a long term evolution (LTE) wireless access network. Networking system 200 may include UE devices 110 embodied as UEs 205-A and 205-B (as used herein, collectively referred to as "UE 205" and individually as "UE 205-x"), wireless access network 130 embodied as an LTE wireless network 210, which includes an evolved Packet Core (ePC) 212 and an evolved Universal Mobile Telecommunications System (UMTS) Terrestrial Network (eUTRAN) 214, an Internet Protocol (IP) network 250 which may be embodied as or included in back end network 135, and a WiFi wireless access point (WAP) 225.

LTE wireless network 210 may include one or more devices that are physical and/or logical entities interconnected via standardized interfaces. LTE wireless network 210 provides wireless packet-switched services and wireless IP connectivity to UEs 205 to provide, for example, data, voice, and/or multimedia services. The ePC 212 may further include a mobility management entity (MME) 230, a serving gateway (SGW) device 240, a packet data network gateway (PGW) 270, a home subscriber server (HSS) and an Authentication, Authorization and Accounting server 260, and policy and charging rules function (PCRF) device 272. In FIG. 2, HSS and AAA servers 260 are shown as combined entity, but may in some embodiments be separate modules that may be implemented as separate devices. The eUTRAN 214 may further include one or more eNodeBs 220 (herein referred to collectively as "eNodeB 220" and individually as "eNodeB 220-x"). It is noted that FIG. 2 depicts a representative networking system 200 with exemplary components and configuration shown for purposes of explanation. Other embodiments may include additional or different network entities in alternative configurations than which are illustrated in FIG. 2.

Further referring to FIG. 2, each eNodeB 220 may include one or more devices and other components having functionality that allow UE 205 to wirelessly connect to eUTRAN 214. ENodeB 220 may interface with ePC 212 via a S1 interface, which may be split into a control plane S1-MME interface 225-A and a data plane S1-U interface 226-A. S1-MME interface 225-A may interface with MME 230. S1-MME interface 225-A may be implemented, for example, with a protocol stack that includes a Non-Access Stratum (NAS) protocol and/or Stream Control Transmission Protocol (SCTP). S1-U interface 226-A may interface with SGW 240 and may be implemented, for example, using a General Packet Radio Service Tunneling Protocol version 2 (GTPv2). ENodeB 220-A may communicate with eNodeB 220-B via an X2 interface 222. X2 interface 222 may be implemented, for example, with a protocol stack that includes an X2 application protocol and SCTP.

MME 230 may implement control plane processing for LTE wireless network 210. For example, MME 230 may implement tracking and paging procedures for UE 205, may activate and deactivate bearers for UE 205, may authenticate a user of UE 205 and/or register UE 205 to provide mobile directory number (MDN) values, and may interface to non-LTE radio access networks. A bearer may represent a logical channel with particular quality of service (QoS) requirements. MME 230 may also select a particular SGW 240 for a particular UE 205. A particular MME 230 may interface with other MMEs 230 in ePC 212 and may send and receive information associated with UEs 205, which may allow one MME 230 to take over control plane processing of UEs serviced by another MME 230, if the other MME becomes unavailable. MME 230 may communicate with SGW 240 through an S11 interface 235. S11 interface 235 may be implemented, for example, using GTPv2. S11 interface 235 may be used to create and manage a new session for a particular UE 205. S11 interface 235 may be activated when MME 230 needs to communicate with SGW 240, such as when the particular UE 205 attaches to ePC 212, when bearers need to be added or modified for an existing session for the particular UE 205, when a connection to a new PGW 270 needs to created, or during a handover procedure (e.g., when the particular UE 205 needs to switch to a different SGW 240).

SGW 240 may provide an access point to and from UE 205, may handle forwarding of data packets for UE 205, and may act as a local anchor point during handover procedures between eNodeBs 220. SGW 240 may interface with PGW 270 through an S5/S8 interface 245. S5/S8 interface 245 may be implemented, for example, using GTPv2.

PGW 270 may function as a gateway to IP network 250 through a SGi interface 255. IP network 250, which may provide various services (e.g., over the top voice services, specific data exchanges, etc.) to UE 205. A particular UE 205, while connected to a single SGW 240, may be connected to multiple PGWs 270, one for each packet network with which UE 205 communicates.

Alternatively, UE 205 may exchange data with IP network 250 though WiFi wireless access point WAP 225. The WiFi WAP 225 may be part of a local area network, and access IP network 250 through a wired connection via a router. Alternatively, WiFi WAP 225 may be part of a mesh network (e.g., 801.11s). WiFi WAP 225 may be part of a local area network, or part of a wide area network (WiMaxx) or a mesh network (801.11s).

Regarding HSS/AAA 260, the HSS may store information associated with UEs 205 and/or information associated with users of UEs 205. For example, the HSS may store subscriber profiles that include registration, authentication, and access authorization information. In an embodiment, the HSS may associate a pre-provisioned subscriber profile associated with a particular pseudo IMSI. MME 230 may communicate with the HSS through an S6a interface 265. S6a interface 265 may be implemented, for example, using a Diameter protocol. Regarding the AAA of HSS/AAA 260, AAA may provide the functionality of determining what services a user can access, at what Quality of Service (QoS), and how much data deduct from the user's account. The AAA may communicate with PGW 270 over an S6b interface 275 for mobility related authentication. Further regarding HSS/AAA 260, the HSS and AAA may communicate over an SWx interface (not shown) using a Diameter protocol.

PCRF 272 may provide policy control decision and flow based charging control functionalities. PCRF 272 may provide network control regarding service data flow detection, gating, QoS and flow based charging, etc. PCRF 272 may determine how a data stream is treated once mapped to a bearer, and may ensure that the user plane traffic mapping and treatment is in accordance with a user's subscriber profile. PCRF 272 may communicate with PGW 240 using a Gx interface 224. Gx interface 224 may be implemented, for example, using a Diameter protocol.

Embodiments provided may only require tailored treatment at the HSS, while other network elements in ePC 212 may not be impacted by the fact that a pseudo-IMSI is being used instead of a real IMSI, as long as the pseudo-IMSI is in the proper format expected by the network elements. In some implementations, the HSS may be modified with respect to a conventional HSS to recognize a pseudo-IMSI and to provide back a pre-provisioned subscriber profile for queries using the pseudo-IMSI. Also, MME 260 may require additional memory to ensure sufficient pseudo-IMSI address space to allocate a unique pseudo-IMSI to multiple UE devices 205 that may be simultaneously attaching with a UGUTI.

While FIG. 2 shows exemplary components of networking system 200, in other implementations, networking system 200 may include fewer components, different components, differently arranged components, or additional components than depicted in FIG. 2. Additionally or alternatively, one or more components of networking system 200 may perform functions described as being performed by one or more other components of networking system 200.

Figure 3:
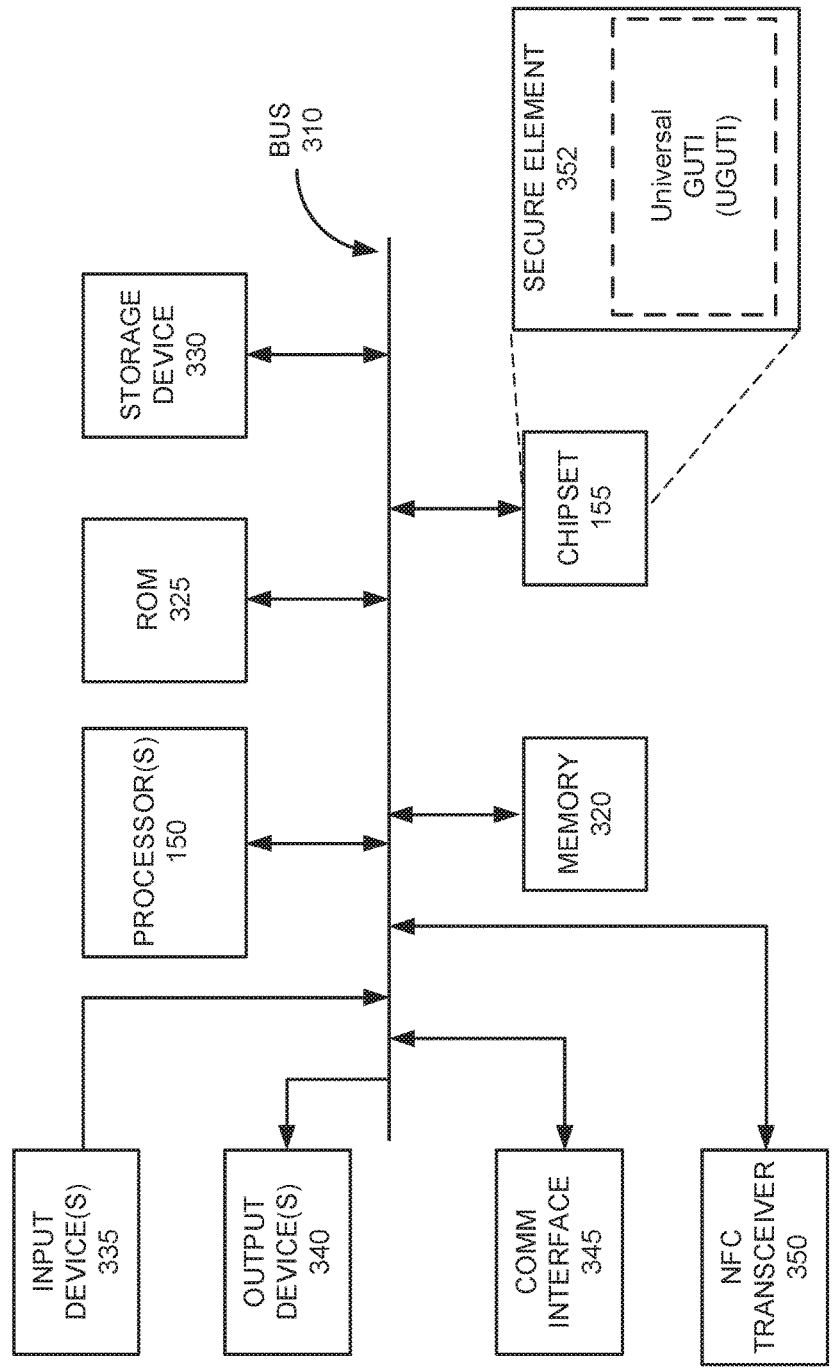
FIG. 3 is a block diagram showing exemplary components of a UE device according to an embodiment.

FIG. 3 is a block diagram showing exemplary components of UE device 110 according to an embodiment. UE device 110 may include one or more processor(s) 150. In some embodiments, a modem (not shown) may be included as a separate processor, or integrated with processor 150 and chipset 365. UE device 110 may further include a bus 310, a memory 320, a storage device 330, an input device(s) 335, an output device(s) 340, a communication interface 345, and a Near Field Communications (NFC) transceiver 350. Chipset 365 may further include a secure element 352 which may securely store the UGUTI. Bus 310 may include a path that permits communication among the elements of UE device 110.

Processor 150 may include a processor, microprocessor, or processing logic that may interpret and execute instructions. Memory 320 may include a random access memory (RAM) or another type of dynamic storage device that may store information and instructions for execution by processor 150. Memory 320 may further include read only memory (ROM) by incorporating a ROM device or another type of static storage device that may store static information and instructions for use by processor 150. Storage device 330 may include a high density non-volatile RAM suitable for mass storage, and/or magnetic and/or optical recording medium and a corresponding drive.

Input device(s) 335 may include one or more mechanisms that permit an operator to input information to UE device 110, such as, for example, a keypad or a keyboard, a microphone, voice recognition and/or biometric mechanisms, etc. Output device(s) 340 may include one or more mechanisms that output information to the operator, including a display, a speaker, etc. Communication interface 345 may include any transceiver mechanism that enables UE device 110 to communicate with other devices and/or systems. For example, communication interface 345 may include mechanisms for communicating with another device or system via a network, such as network 120. A Near Field Communications (NFC) transceiver 350 may interface with bus 310 to permit UE device 110 to exchange data with NFC readers, thus allowing convenient transactions with appropriately equipped Point of Sale terminals, kiosks, building security gateways, etc.

Chipset 365 may provide "glue" logic for interfacing with processor 150, memory 320, and other components of UE device 110 over bus 310. Additionally, chipset 365 may include one or more internal processors and internal memory (e.g., volatile and/or non-volatile RAM) which may be electrically isolated from bus 310 and/or thus other components of UE device 110 for performing secure operations. For example, chipset 365 may include a so-called secure element 352 and/or a secure enclave. In some embodiments, as shown in the example illustrated in FIG. 3, chipset 365 may include a secure element 352. Secure element 352 may include its own secure processor, I/O circuits, and secure storage (e.g., non-volatile solid-state memory such as RAM and/or ROM, volatile RAM, electrically erasable programmable ROM (EEPROM), etc.) to store UGUTI and/or a subscriber identification profile (SIDP).

The UGUTI is designed to avoid conflicts in which multiple UEs 110 attempt to use the UGUTI at the same time with the same MME 230. A conventional GUTI is 80 bits in length and consists of two parts: 1) a 48-bit globally unique mobility management entity identifier (GUMMEI), which uniquely identifies the MME that issued the GUTI and which can only be recognized and accepted by this particular MME when UE device 110 re-attaches to network 120; and 2) a 32-bit M temporary mobile subscriber identity (M-TMSI), which uniquely identifies the UE on that MME. For the conventional GUTI, the MME assigns the M-TMSI, and can ensure that no two devices have the same value at the same time. However, for embodiments presented herein, the UGUTI is not generated by MME 230, thus a challenge may be presented for MME 230 to ensure uniqueness.

Embodiments include approaches to address the uniqueness challenge by using the following structure for the UGUTI: 1) a 48-bit Universal GUMMEI, which uniquely specifies that this UGUTI may be one of many possible UGUTIs (which is going to be recognized and accepted by all MMEs of a mobile network operator instead of being only recognized and allowed by one particular MME as in the case of conventional GUTI); and 2) a 32-bit M-TMSI, which uniquely identifies UE device 110 for a particular UGUTI. In an embodiment, UE device 110 may provide its own 32-bit M-TMSI for the UGUTI. A number of different techniques can generate a value that is unique (or at least likely to be unique). In one embodiment, a simple approach would be to randomly generate an M-TMSI value, making it highly unlikely that any two UE devices 110 devices would be attempting initial access at the same time on the same MME 230 with the same 32-bit random M-TMSI. Other more sophisticated solutions are possible, such as, for example, deriving an M-TMSI value from UE's 110 international mobile equipment identifier (IMEI) or having the device manufacturer assign a unique M-TMSI value at the factory as devices are fabricated.

UE device 110 may perform certain operations or processes, as may be described in detail below. UE device 110 may perform these operations in response to at least one processor 150 executing software instructions contained in a computer-readable medium, such as memory 320. A computer-readable medium may be defined as a physical or logical memory device. A logical memory device may include memory space within a single physical memory device or spread across multiple physical memory devices.

The software instructions may be read into memory 320 from another computer-readable medium, such as storage device 330, or from another device via communication interface 345. The software instructions contained in memory 320 may cause processor 150 to perform operations or processes that will be described in detail with respect to FIG. 6. Alternatively, hardwired circuitry may be used in place of or in combination with software instructions to implement processes consistent with the principles of the embodiments. Thus, exemplary implementations are not limited to any specific combination of hardware circuitry and software.

The configuration of components of UE device 110 illustrated in FIG. 3 is for illustrative purposes only. It should be understood that other configurations may be implemented. Therefore, UE device 110 may include additional, fewer and/or different components than those depicted in FIG. 3.

Figure 4:
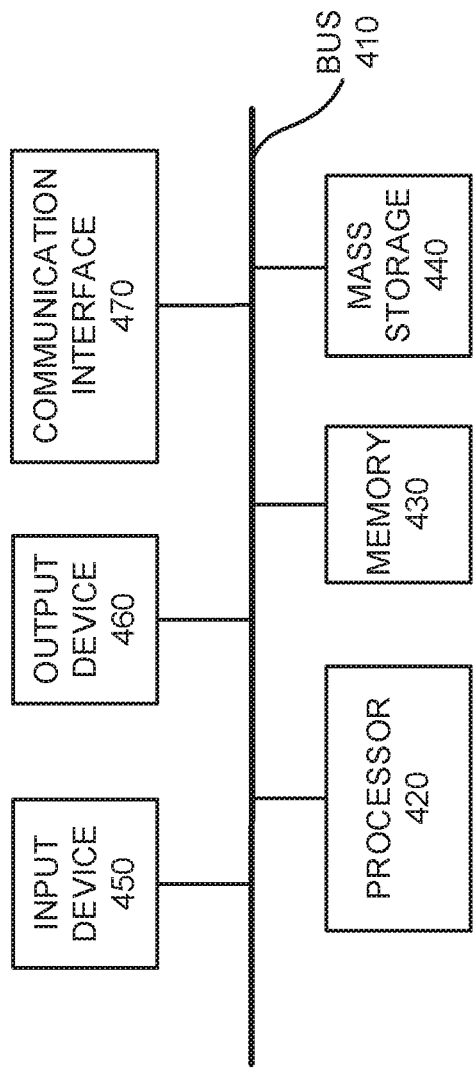
FIG. 4 is a block diagram showing exemplary components of a network element which may reside in a component in a networking system.

FIG. 4 is a block diagram showing exemplary components of a network element 400 which may reside in a component in networking system 200, such as, for example permitted network device 140, MME 230, SGW 240, HSS/AAA 260, PGW 270, and/or PCRF 272.

Network element 400 may include a bus 410, a processor 420, a memory 430, mass storage 440, an input device 450, an output device 460, and a communication interface 470.

Bus 410 includes a path that permits communication among the components of network element 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic. For example, processor 420 may be an x86 based CPU, and may use any operating system, which may include varieties of the Windows, UNIX, and/or Linux. Processor 420 may also use high-level analysis software packages and/or custom software written in any programming and/or scripting languages for interacting with other network entities.

Memory 430 may include any type of dynamic storage device that may store information and/or instructions, for execution by processor 420, and/or any type of non-volatile storage device that may store information for use by processor 420. For example, memory 430 may include a RAM or another type of dynamic storage device, a ROM device or another type of static storage device, and/or a removable form of memory, such as a flash memory. Mass storage device 440 may include any type of on-board device suitable for storing large amounts of data, and may include one or more hard drives, solid state drives, and/or various types of Redundant Array of Independent Disk (RAID) arrays.

Input device 450, which may be optional, can allow an operator to input information into network element 400, if required. Input device 450 may include, for example, a keyboard, a mouse, a pen, a microphone, a remote control, an audio capture device, an image and/or video capture device, a touch-screen display, and/or another type of input device. In some embodiments, network element 400 may be managed remotely and may not include input device 450. Output device 460 may output information to an operator of network element 400. Output device 460 may include a display (such as a Liquid Crystal Display (LCD)), a printer, a speaker, and/or another type of output device. In some embodiments, network element 400 may be managed remotely and may not include output device 460.

Communication interface 470 may include a logical component that includes input and/or output ports, input and/or output systems, and/or other input and output components that facilitate the transmission of data to other devices. For example, communication interface 470 may include a network interface card (e.g., Ethernet card) for wired communications and/or a wireless network interface (e.g., a Wi-Fi) card for wireless communications. Communication interface 470 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form. Communication interface 470 may further include one or more radio frequency (RF) transceivers that enable communications with UE devices 110 via wireless channels in eUTRAN 214. An RF transceiver may include an RF transmitter that receives signals to be transmitted wirelessly and performs signal processing on the signals before providing the signals to an antenna assembly (not shown), and an RF receiver (not shown) that receives signals from the antenna assembly and performs signal processing on the received signals before providing the received signals to processor 420. For example, the RF transceiver may perform analog-to-digital and digital-to-analog conversion, modulation and demodulation, up-conversion and down-conversion, and/or amplification of signals.

As described below, network element 400 may perform certain operations relating to permitted network device 140, SGW 240, PGW 270, PCRF 272, MME, 230, and/or HSS/AAA 260, (or other devices/systems in networking environment 200). Network element 400 may perform these operations in response to processor 420 executing software instructions contained in a computer-readable medium, such as memory 430 and/or mass storage 440. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software. Although FIG. 4 shows exemplary components of network element 400, in other implementations, network element 400 may include fewer components, different components, additional components, or differently arranged components than depicted in FIG. 4.

Figure 5A:
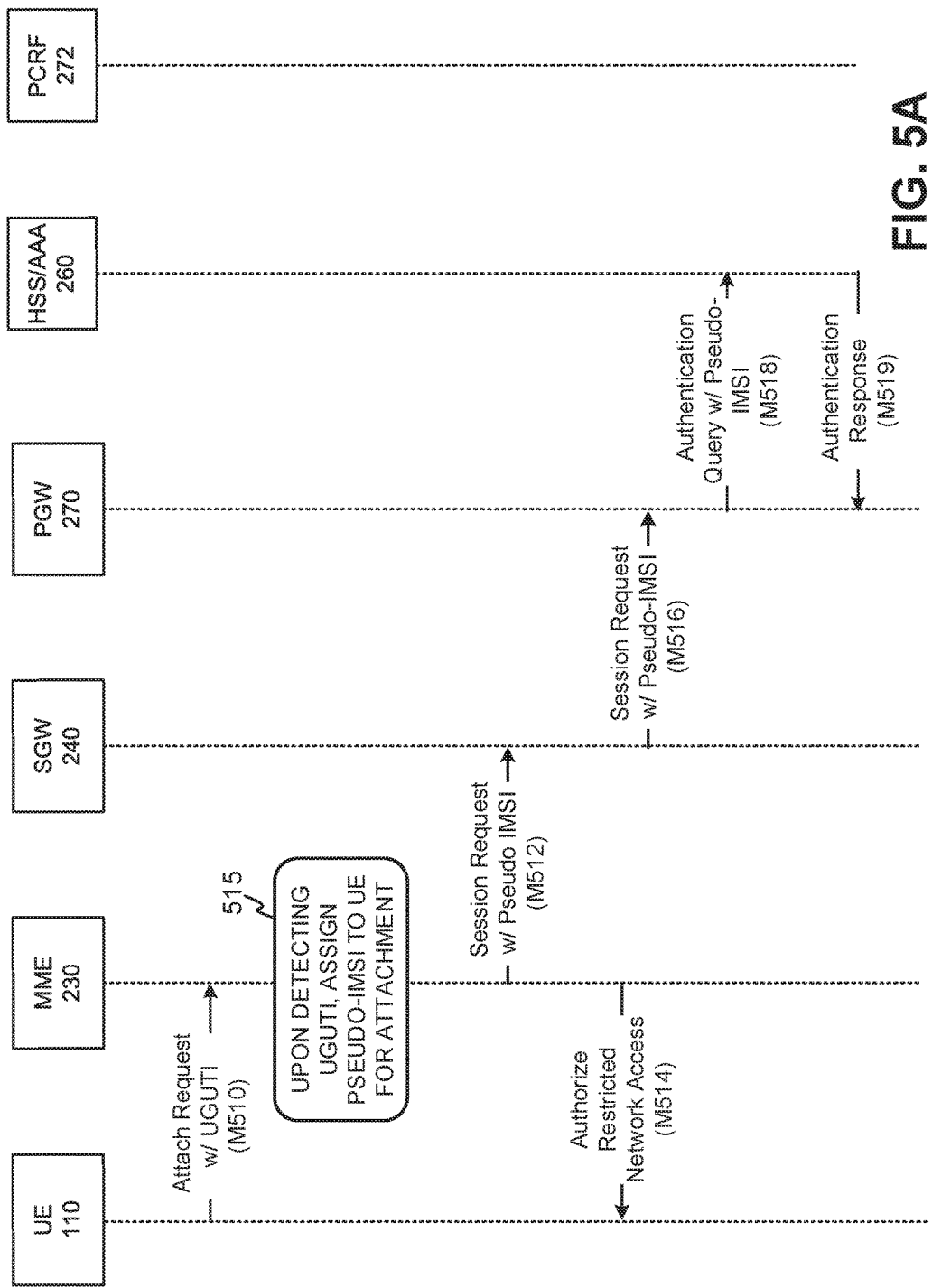
FIGS. 5A and 5B are exemplary signal flow diagrams illustrating communications between network entities according to an embodiment.
Figure 5B:
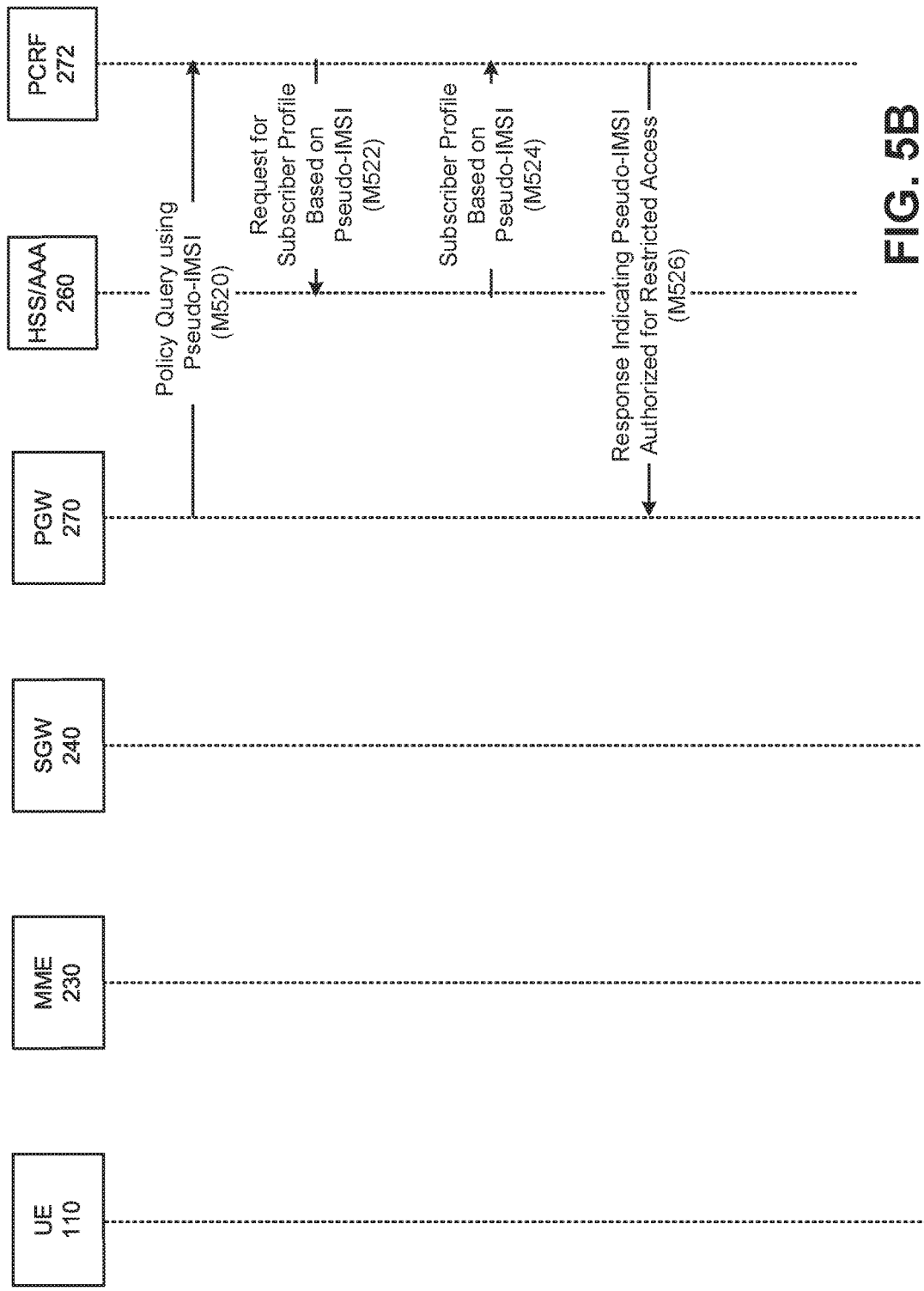

FIGS. 5A and 5B are exemplary signal flow diagrams illustrating communications between network entities according to an embodiment. As shown in FIG. 5A, UE device 110 may determine, based on internal logic, to attach to network 120 using the UGUTI. UE device 110 may then send an attach request to MME 230 (M510). The attach request M510 includes the UGUTI, and upon its reception, MME 230 may detect the UGUTI and treat the UGUTI differently than a conventional GUTI. In an embodiment, upon detecting the UGUTI, MME 230 may assign a pseudo-IMSI to UE device 110 for the duration of the attachment (Block 515). The pseudo IMSI identifies UE device 110 to the rest of the network elements in ePC 212 (e.g., SGW 230, PGW 270, HSS/AAA 260, and PCRF 272). A real IMSI is the identifier used at each network element, but as per the overall onboarding concept consistent with various embodiments, UE device 110 will not yet have a specific mobile network operator's (MNO's) real IMSI when UE device 110 first attaches. In a conventional attach procedure, when UE device 110 attaches with a real GUTI, MME 230 replaces the GUTI with UE device's 110 IMSI before sending the signaling downstream to the rest of the network elements. For various embodiments, MME 230 cannot use this approach since there is no real IMSI associated with the subscriber profile for the UGUTI. Accordingly, embodiments described herein addressed this issue by having MME 230 assign a unique pseudo IMSI to UE device 110 during attachment as shown in Block 515. When UE device 110 attaches to the network using the UGUTI, MME 230 assigns the unique pseudo-IMSI to be used for all downstream signaling as shown in FIGS. 5A and 5B. Additionally, during process shown in Block 515, MME 230 may use a pre-provisioned cached subscriber profile that limits access to network 120 to a specific APN, or provides other limitations regarding the type of access.

MME 230 may send a session request along with the pseudo IMSI to SGW 240 (M512). MME 230 may send a response back to UE device 110 authorizing restricted network access (M514). SGW 240 may forward the session request and pseudo IMSI to PGW 270 (M516). PGW 270 may then authenticate the pseudo IMSI by querying HSS/AAA 260 using pseudo IMSI (M518). In an embodiment, request may take place over an S6b interface 275 based on the Diameter protocol. HSS/AAA 260 may respond with a standard authentication based on the pseudo IMSI associated with UGUTI (M519).

Referring to FIG. 5B, PGW 270 may then send a policy query using the pseudo IMSI to PCRF 272 (M520). In an embodiment, this query may be performed over the Gx interface to support the transfer of policy control and charging rules information (e.g., quality of service (QoS)). PCRF 272 may then send a request for the subscriber profile to HSS/AAA 260 (M522). The request may be based on the pseudo IMSI which is included in the request. HSS/AAA 260 may look up a subscriber profile based on the pseudo IMSI and respond with the subscriber profile information back to PCRF 272 (M524). PCRF 272 may then send a response over the Gx interface to the PGW 270 indicating that UE device 110 associated with the pseudo IMSI is authorized for restricted access to network 120. The restriction may be enforced by a restricted APN which effectively creates a "walled garden" for UE device 110 that limits access to the network.

Figure 6:
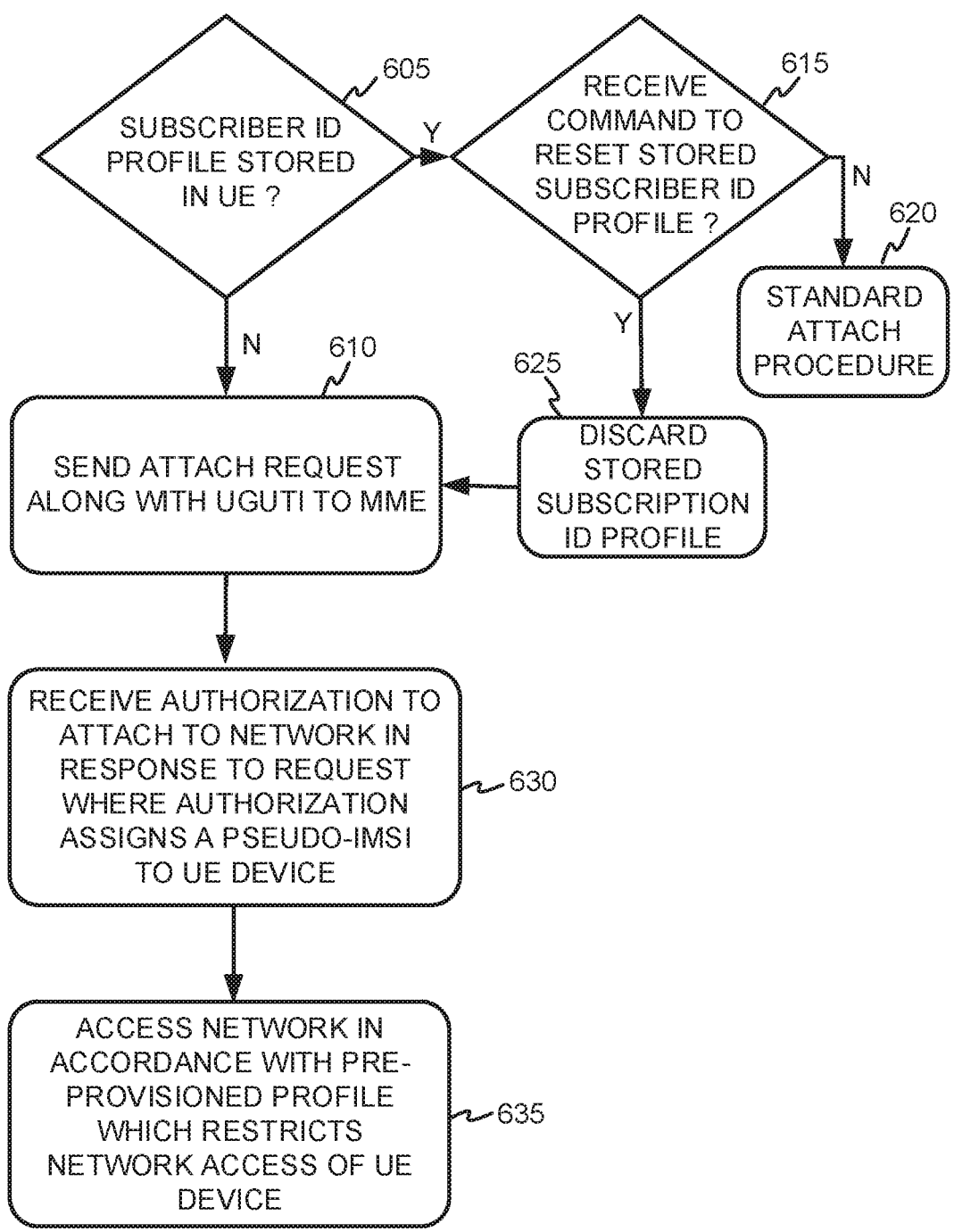
FIG. 6 is a flow chart showing an exemplary process for a UE device accessing a network using the UGUTI.

FIG. 6 is a flow chart showing an exemplary process 600 for UE device 110 to access a network using the UGUTI. In an embodiment, process 600 may be executed by one or more processors residing in UE device 110, such as processor 150, a modem, and/or secure processor(s) within chipset 365 (e.g., residing within an eUICC and/or a secure element 352). Initially, UE device 110 may determine whether a subscriber identification profile (SIDP) is stored within UE device 110 device (Block 605). Determining whether the SIDP is stored in UE device 110 may be done upon initially powering on UE device 110 or when the UE device 110 is power cycled.

Upon UE device 110 determining that no SIDP is stored in chipset 365 (or any other storage element depending upon various other embodiments), UE device 110 may scan and find wireless access network 130. UE device 110 may send an attach request, along with the UGUTI, to MME 230 within wireless access network 130, upon determining that the subscriber identification profile is not stored in the UE device 110 (Block 610). In an alternative embodiment, Block 610 may also be performed if UE device 110 receives a reject message with an error cause code when using the stored profile to access network 130.

The UGUTI may include two parts. The first part of the UGUTI may be associated with the network. The second part of the UGUTI may uniquely identify UE device 110. In an embodiment the first part of the UGUTI may include a globally unique mobility management entity identifier (GUMMEI). The GUMMEI may be selected from a set of predefined GUMMEIs. In an embodiment, the GUMMEI may be preinstalled in UE device 110 and be associated with at least one of a device vendor, a network operator, or a service. For example, during manufacturing, a GUMMEI may be loaded into UE device 110. In an embodiment, the second part of the UGUTI may include an M temporary mobile subscriber identity (M-TMSI), where the M-TMSI may be generated by the UE device 110. The M-TMSI may be based on at least one of a random number or an international mobile equipment identity (IMEI) associated with UE device 110.

Referring to FIG. 6, UE device 110 may receive an authorization to attach to the network in response to the attach request, where the authorization assigns a unique pseudo IMSI to UE device 110 (Block 630). During attachment, MME 230 may associate UE device 110 with a unique pseudo IMSI assigned during attachment. The pseudo IMSI may be uniquely associated with the UGUTI and used for downstream signaling in network 120. Network 120 will not return the pseudo IMSI to UE device 110.

Once wireless access network 130 establishes a session based on the pseudo IMSI, UE device 110 may access network 120 in accordance with a pre-provisioned profile associated with the UGUTI (Block 635). The pre-provisioned profile may restrict network access of UE device 110 based on a restricted APN.

Referring back to Block 605 in FIG. 6, if UE device 110 determines that an SIDP is stored in chipset 365 (or any other storage element depending upon various other embodiments), UE device 110 may further determine whether a predetermined command was received to reset the SIDP (Block 615). If a predetermined command was not received, UE device 110 may perform a standard attach procedure using the real IMSI value of UE device 110 (Block 620). Alternatively, in response to UE device 110 determining a predetermined command was received to reset the SIDP, UE device 110 may discard the SIDP currently stored in UE device 110 (e.g., erasing the memory storing the SIDP, or flagging the memory to be overwritten with a new SIDP) (Block 625), and send the initial attach request along with UGUTI to MME 230 (Block 610). In an embodiment, determining whether a predetermined command was received may include having UE device 110 receive an activation of a switch sequence, a simultaneous activation of a combination of switches, an activation of a dedicated switch, and/or a switch actuation lasting a predetermined period of time. The predetermined command may further include receiving the predetermined command upon the powering on of UE device 110. A switch may be activated by physical buttons on UE device 110, graphical controls activated by a touch screen display, and/or other recessed controls activated by a tool such as, for example, a pen or paper clip.

Figure 7:
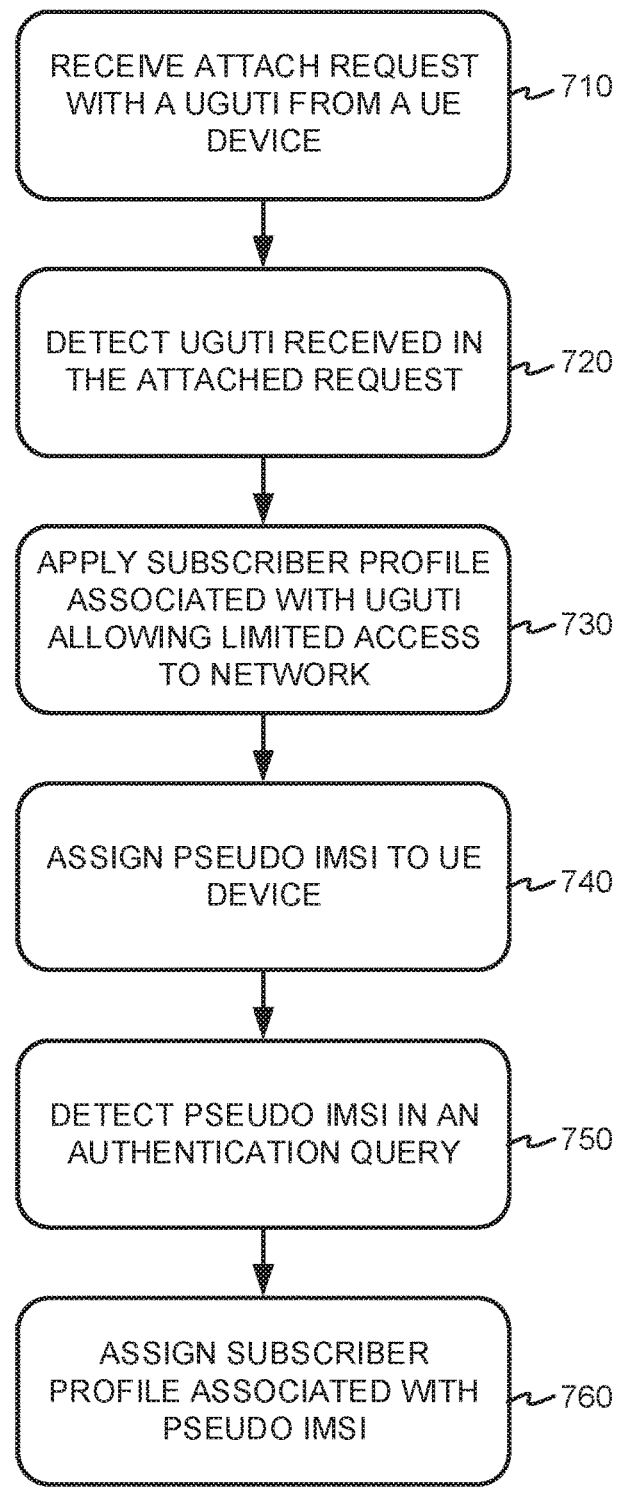
FIG. 7 is a flow chart showing an exemplary process of a network facilitating onboarding of a UE device based upon a UGUTI.

FIG. 7 is a flow chart showing an exemplary process 700 for onboarding UE device 110 to network 120 based upon a UGUTI. In an embodiment, process 700 may be executed by one or more network devices in network 120, including, for example, MME 230, HSS/AAA 260, SGW 240, PGW 270, and/or PCRF 272. Regarding process 700, initially MME 230 may receive an attach request from UE device 110 (Block 710). The attach request may include the UGUTI stored within UE device 110. MME 230 may then detect the UGUTI received in the attach request (Block 720).

Upon detecting the UGUTI, MME 230 may apply a subscriber profile associated with the UGUTI (Block 730). For facilitating the use of the UGUTI, a network operator can pre-provision subscriber profiles on each MME 230, where the subscriber profiles may be stored/cached within MME 230. Thus, in this case, MME 230 may skip conventional authentication (which cannot succeed without a real IMSI), and use the stored subscriber profile rather than attempting to retrieve the subscriber profile from HSS/AAA 260. The subscriber profile only allows limited access to network 120, for example, on a specific APN. MME 230 may then assign a pseudo IMSI to the UE device (Block 740) based on the detected UGUTI. The pseudo IMSI may be used for all downstream signaling, and serves as an identifier for various network elements in ePC 212, such as, for example, HSS/AAA 260, SGW 240, PGW 270, and PCRF 272.

Further referring to FIG. 7, process 700 may include having HSS/AAA 260 detect the pseudo IMSI received in an authentication query (Block 750). Upon detecting the pseudo IMSI, HSS/AAA 260 may assign the subscriber profile associated with the pseudo IMSI (Block 760). The HSS/AAA 260 may receive requests for subscriber profile from PCRF 272 to provide the subscriber profile information based on the pseudo IMSI. The PCRF 272 may apply a policy based on the subscriber information profile, which can be provided to PGW 270 to establish the limited network access for UE 110.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The foregoing description of implementations provides illustration and description, but is not intended to be exhaustive or to limit the invention to the precise form disclosed. Modifications and variations are possible in light of the above teachings or may be acquired from practice of the invention. For example, while series of messages and/or blocks have been described with regard to FIGS. 5A-6, the order of the messages and/or blocks may be modified in other embodiments. Further, non-dependent messaging and/or processing blocks may be performed in parallel.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   determining, by a user equipment (UE) device, whether subscriber identification profile (SIDP) is stored within the UE device;
   sending, from the UE device, an attach request along with a universal globally unique temporary identifier (UGUTI) to a mobility management entity (MME) within a network, upon determining that the subscriber identification profile is not stored in the UE device;
   receiving, at the UE device, an authorization to attach to the network in response to the attach request; and
   accessing, by the UE device, the network in accordance with a pre-provisioned profile associated with the UGUTI, wherein the pre-provisioned profile limits access to the network.

2. The method of claim 1, wherein the UGUTI comprises two parts, wherein a first part of the UGUTI is associated with the network, and a second part of the UGUTI is associated with the UE device.

3. The method of claim 2, wherein the first part of the UGUTI comprises a globally unique mobility management entity identifier (GUMMEI), wherein the GUMMEI is selected from a plurality of predefined GUMMEIs.

4. The method of claim 3, wherein the GUMMEI is preinstalled in the UE device, and is associated with at least one of a device vendor, a network operator, or a service.

5. The method of claim 2, wherein the second part of the UGUTI comprises an M temporary mobile subscriber identity (M-TMSI), wherein the M-TMSI is generated by the UE device.

6. The method of claim 5, further comprising:
   generating, by the UE device, an M-TMSI which is based on at least one of a random number or an international mobile equipment identity (IMEI) associated with the UE device.

7. The method of claim 1, wherein the UE device is associated with a unique pseudo international mobile subscriber identity (IMSI) assigned during attachment, wherein the pseudo IMSI is uniquely associated with the UGUTI and is used for downstream signaling in the network.

8. The method of claim 1, wherein upon determining that the SIDP is stored in the UE device, further comprising:
   determining whether a predetermined command was received to reset the SIDP, and in response to determining a predetermined command was received:
      discarding the stored SDIP from the UE device, and
      sending the attach request along with the UGUTI to the MME within the network; and
      wherein upon determining that the predetermined command was not received, performing an attach procedure.

9. The method of claim 8, wherein determining whether a predetermined command was received further comprises:
   receiving at least one of an activation of a switch sequence, a simultaneous activation of a combination of switches, an activation of a dedicated switch, or a switch actuation lasting a predetermined period of time.

10. The method of claim 8, wherein determining whether a predetermined command was received further comprises:
    receiving the predetermined command upon powering on the UE device.

11. A user equipment (UE) device, comprising:
    a secure element configured to store a universal globally unique temporary identifier (UGUTI);
    at least one memory configured to store instructions; and
    at least one processor couple to the secure element and the at least one memory, wherein the at least one processor is configured to execute the instructions to:
       determine whether subscriber identification profile (SIDP) is stored within the UE device,
       send an attach request along with the UGUTI to a mobility management entity (MME) within a network, upon determining that the subscriber identification profile is not stored in the UE device, receive an authorization to attach to the network in response to the attach request, and access the network in accordance with a pre-provisioned profile associated with the UGUTI, wherein the pre-provisioned profile limits access to the network.

12. The UE device of claim 11, wherein the UGUTI comprises two parts, wherein a first part of the UGUTI is associated with the network, and a second part of the UGUTI uniquely identifies the UE device.

13. The UE device of claim 12, wherein the first part of the UGUTI comprises a globally unique mobility management entity identifier (GUMMEI), wherein the GUMMEI is selected from a plurality of predefined GUMMEIs.

14. The UE device of claim 13, wherein the GUMMEI is preinstalled into the UE device, and is associated with at least one of a device vendor, a network operator, or a service.

15. The UE device of claim 12, wherein the second part of the UGUTI comprises an M temporary mobile subscriber identity (M-TMSI), wherein the M-TMSI is generated by the UE device.

16. The UE device of claim 15, wherein the instructions further cause the at least one processor to:

generate, by the UE device, the M-TMSI based on at least one of a random number or an international mobile equipment identity (IMEI) associated with the UE device.

17. The UE device of claim 11, wherein the UE device is associated with a unique pseudo IMSI assigned during attachment, and further wherein the pseudo IMSI is uniquely associated with the UGUTI and is used for downstream signaling in the network.

18. The UE device of claim 11, wherein in response to determining that the SIDP is stored in the UE device, the instructions further cause the at least one processor to:

determine whether a predetermined command was received to reset the SDIP, and in response to determining a predetermined command was received, discard the SDIP from the UE device, and send the attach request along with the UGUTI to the MME within the network, and wherein upon determining that the predetermined command was not received, the instructions further cause the at least one processor to perform an attach procedure.

19. The UE device of claim 18, wherein upon determining whether a predetermined command was received, the instructions further cause the at least one processor to:

receive at least one of an activation of a switch sequence, a simultaneous activation of a combination of switches, an activation of a dedicated switch, or a switch actuation lasting a predetermined period of time.

20. A method, comprising:

receiving, from a user equipment (UE) device, an attach request along with a universal globally unique temporary identifier (UGUTI) at a mobility management entity (MME) within a network;

detecting, at the MME, the UGUTI received in the attach request;

applying, at the MME, a subscriber profile associated with the UGUTI, wherein the subscriber profile is stored within the MME and allows limited access to the network;

assigning, at the MME, a pseudo international mobile subscriber identity (IMSI) to the UE device;

detecting, at a home subscriber server (HSS), the pseudo IMSI received in an authentication query; and assigning, at the HSS, the subscriber profile associated with the pseudo IMSI.

* * * * *